(12) United States Patent
Ayyappan et al.

(10) Patent No.: US 8,518,354 B2
(45) Date of Patent: Aug. 27, 2013

(54) DIESEL EXHAUST FLUID FORMULATION HAVING A HIGH AMMONIUM CONTENT AND A LOW FREEZING POINT

(75) Inventors: Ponnayan Ayyappan, Cedar Falls, IA (US); Tom Harris, Waterloo, IA (US); Danan Dou, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 9 days.

(21) Appl. No.: 13/193,715

(22) Filed: Jul. 29, 2011

(65) Prior Publication Data

US 2013/0028817 A1    Jan. 31, 2013

(51) Int. Cl.
| | |
|---|---|
| B01D 53/92 | (2006.01) |
| B01D 53/94 | (2006.01) |
| C09K 3/00 | (2006.01) |
| F01N 3/08 | (2006.01) |
| F01N 3/10 | (2006.01) |

(52) U.S. Cl.
USPC .................. 423/212; 423/213.2; 252/182.12; 252/182.34; 60/295; 60/299

(58) Field of Classification Search
USPC ................ 60/295, 299; 252/182.12, 182.34; 423/212, 213.2
See application file for complete search history.

(56) References Cited

U.S. PATENT DOCUMENTS

| | | | |
|---|---|---|---|
| 4,698,173 A | 10/1987 | Hansen | |
| 6,361,754 B1 * | 3/2002 | Peter-Hoblyn et al. | .... 423/213.2 |
| 7,595,034 B2 | 9/2009 | Nissinen et al. | |
| 7,744,837 B2 | 6/2010 | Nissinen et al. | |
| 2007/0054409 A1 | 3/2007 | Inoue et al. | |
| 2007/0056267 A1* | 3/2007 | Handler et al. | ................. 60/286 |
| 2009/0031713 A1 | 2/2009 | Suzuki | |

FOREIGN PATENT DOCUMENTS

| | | |
|---|---|---|
| DE | 3839936 A1 | 5/1990 |
| EP | 2014348 A2 | 1/2009 |
| JP | 7278531 A | 10/1995 |
| JP | 7316545 A | 12/1995 |
| JP | 2000026834 A | 1/2000 |
| WO | WO9202450 A1 | 2/1992 |
| WO | WO9606674 A1 | 3/1996 |
| WO | WO9828070 A1 | 7/1998 |

OTHER PUBLICATIONS

European Search Report and Written Opinion for EP12175555, Oct. 29, 2012.

* cited by examiner

*Primary Examiner* — Timothy Vanoy
(74) *Attorney, Agent, or Firm* — Faegre Baker Daniels LLP

(57) ABSTRACT

A mixture of urea, water and ammonium carbamate is formulated for use in the catalytic reduction of oxides of nitrogen in diesel exhaust. The mixtures may be formulated to optimize the amount of reductant in the mixture and the freezing point of the formulation. These formulations are especially useful in combination with Selective Catalytic Reduction systems and are well suited for use on heavy-duty trucks and heavy duty equipment used off-road. Some of these formations include between about 15.0 wt. % to about 40.0 wt. % urea; between about 15.0 wt. % to about 40.0 wt. % ammonium carbamate; and between about 40.0 wt. % to about 60.0 wt. % water. The formulation may be monitored for ammonia content and/or freezing point and the composition of the formulation may be adjusted to optimize the freezing point and ammonia content.

23 Claims, 1 Drawing Sheet

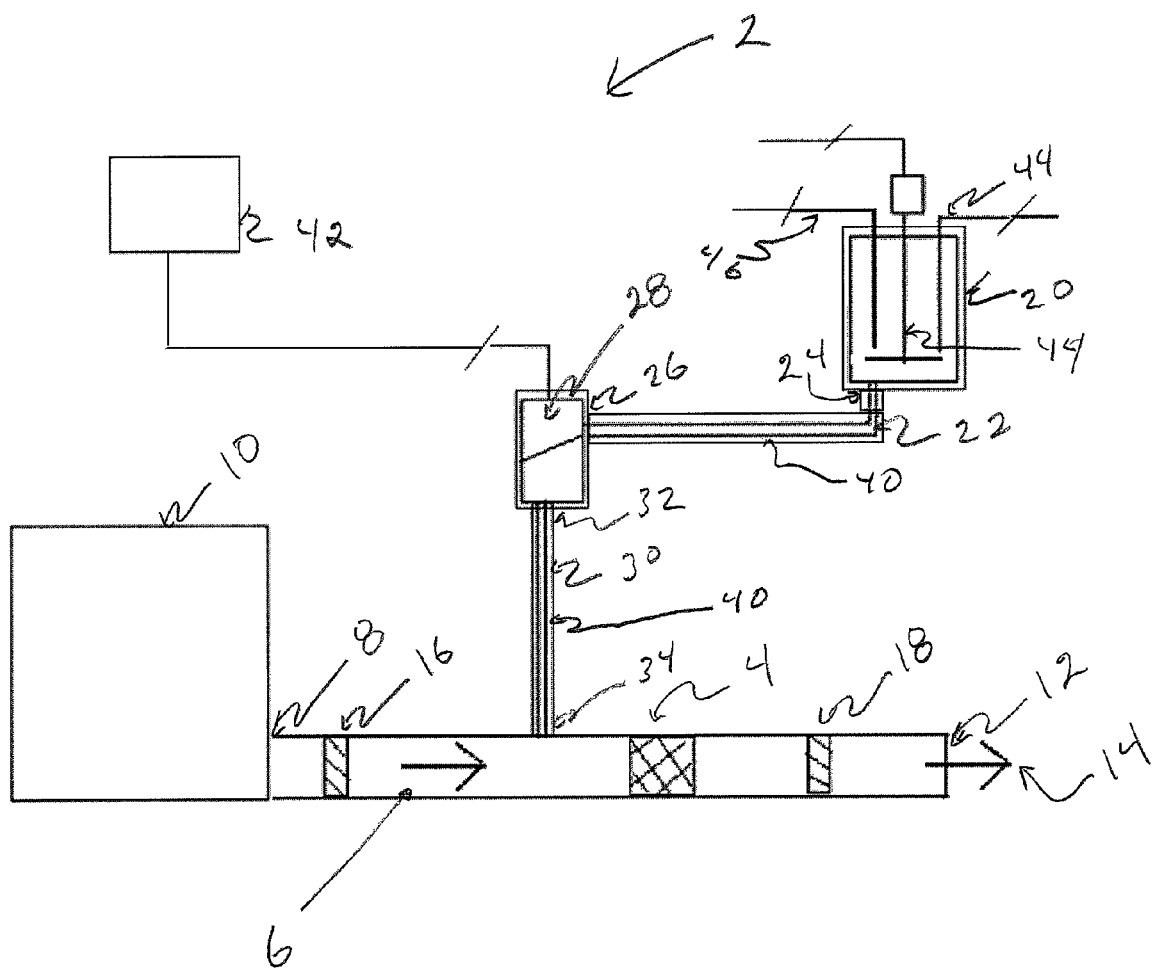

DIESEL EXHAUST FLUID FORMULATION HAVING A HIGH AMMONIUM CONTENT AND A LOW FREEZING POINT

FIELD OF THE INVENTION

This invention relates generally to formulations of urea that have low freezing points and higher ammonia content that are suitable for reducing $NO_x$ (oxides of nitrogen) compounds in diesel exhaust produced by combustion.

BACKGROUND

Diesel engines are the preferred means of producing torque for use in a wide range of applications ranging from uses in transportation such as heavy-duty trucks and trains, off-road agricultural and mining equipment to the large scale production of on-site electrical power to name a few. Their virtually unmatched power to mass ratios and the relative safety of their fuel makes them almost the only choice for use in applications such as long-haul trucks, tractors, earth movers, combines, surface mining equipment, non-electric locomotives, high capacity emergency power generators and the like.

Diesel engines operate at high internal temperature. One consequence of their high operating temperatures is that at least some of the Nitrogen present in the engine at the moment of combustion may combine with Oxygen to form $NO_x$ including species such as NO and $NO_2$. Another consequence of their high operating temperatures is that diesel exhaust at or near the point of exit from the engine is very hot.

A compound such as $NO_x$ is problematic because it readily combines with volatile organic compounds in the atmosphere to form smog. $NO_x$ is regarded as a pollutant and virtually every industrialized nation regulates the levels of $NO_x$ that can be legally discharged into the atmosphere. The regulation governing $NO_x$ emissions are expected to become even stricter. Fortunately, engine and equipment manufacturers have developed systems for reducing the levels of NO produced by the combustion of diesel fuel and released into the environment. Still, with even tighter limits on the amounts of these compound that can be released into the atmosphere there remains a need for improved materials and methods for reducing the levels of $NO_x$; some aspects of the instant invention address this need.

SUMMARY

Some embodiments provide an aqueous solution comprising urea, ammonium carbamate and water for use as a reductant in the treatment of diesel exhaust. Some embodiments provide Diesel Exhaust Fluid (DEF) formulations that may be used in Selective Catalytic Reduction (SCR) systems to reduce the levels of NOx produced by the combustion of diesel fuel and otherwise released into the atmosphere. The DEF disclosed herein include, urea, ammonium carbamate and water. In some embodiments the formulation comprises between about 15.0 wt. % to about 40.0 wt. % urea; between about 15.0 wt. % to about 40.0 wt. % ammonium carbamate; and between about 40.0 wt. % to about 60.0 wt. % water.

Some embodiments provide an aqueous solution which includes ammonium carbamate and urea concentrations suitable as a year round replacement for standard Diesel Exhaust Fluid.

Still other embodiments include formulations of DEF that may especially useful during cold weather operation.

Some embodiments include formulations for reducing oxides of nitrogen, comprising: between about 19.0 wt. % to about 30.0 wt. % urea; between about 15.0 wt. % to about 40.0 wt. % ammonium carbamate; and between about 40.0 wt. % to about 60.0 wt. % water. In some embodiments the formulations include: between about 19.0 wt. % to about 25.0 wt. % urea; between about 20.0 wt. % to about 35.0 wt. % ammonium carbamate; and between about 45.0 wt. % to about wt. 55.0% water. And in still other embodiments the formulations include between about 19.0 wt. % to about 22.0 wt. % urea; between about 30.0 wt. % to about 35.0 wt. % ammonium carbamate; and between about 45.0 wt. % to about 50.0 wt. % water.

Yet other embodiments include methods for reducing an oxide of nitrogen, comprising the steps of: providing a formulation, wherein the formulation includes: urea, ammonium carbamate and water and is suitable for use in SCR of $NO_x$. In some embodiments the formulation comprises between about 15.0 wt. % to about 40.0 wt. % urea; between about 15.0 wt. % to about 40.0 wt. % ammonium carbamate; and between about 40.0 wt. % to about 60.0 wt. % water.

Yet other embodiments include adding ammonium carbamate as a readily soluble powder to a tank that already includes standard DEF. In some embodiments, these methods include the step of supplying pre-packaged quantities of powdered ammonium carbamate which can be added to a reductant tank that includes urea. In some embodiments, these methods include the step of determining the composition of the reductant to insure that the relative levels of water, urea and ammonium carbamate in the reductant system are suitable for use in SCR and the new mixtures exhibit lower freezing temperatures than conventional DEF.

In some embodiment, the methods for reducing oxides of nitrogen include the steps of: supplying at least one SCR catalyst; and contacting the SCR catalyst with said formulation. Some embodiments include the step of measuring the composition of said formulation. While still other embodiments include the further step of adding a portion of ammonium carbamate to a formulation of reductants.

Some embodiments provide DEF formulations suitable for us in methods and/or systems that reduce NOx exhaust emissions that include between about 15.0 wt. % to about 40.0 wt. % urea; between about 15.0 wt. % to about 40.0 wt. % ammonium carbamate; and between about 40.0 wt. % to about 60.0 wt. % water.

Yet other embodiments include systems for reducing an oxide of nitrogen in an engine exhaust, comprising the steps of: a formulation that includes a reductant, wherein the formulation includes: between about 19.0 wt. % to about 30.0 wt. % urea; between about 15.0 wt. % to about 40.0 wt. % ammonium carbamate; and between about 40.0 wt. % to about 60.0 wt. % water; a SCR catalysts, where the catalyst catalyses the reduction of $NO_x$ by said reductant to form products that include $N_2$. In some embodiments, the systems for reducing $NO_x$ emissions include: reductant formulations having between about 19.0 wt. % to about 25.0 wt. % urea; between about 20.0 wt. % to about 35.0 wt. % ammonium carbamate; and between about 45.0 wt. % to about wt. 55.0% water. In some embodiments, the formulations in the systems includes: between about 19.0 wt. % to about 22.0 wt. % urea; between about 30.0 wt. % to about 35.0 wt. % ammonium carbamate; and between about 45.0 wt. % to about 50.0 wt. % water.

In still other embodiments, the systems for reducing $NO_x$ released in the atmosphere from diesel exhaust further includes: a probe for measuring the level of urea in the DEF storage tank. In some embodiments the system may include a means for adjusting the levels of at least one of the following compounds in the DEF mixture wherein the compounds are selected from the group consisting of urea, ammonium carbamate and water. Levels of these components can be adjusted using pumps, powder conveyors, and the like or by manually adding various components to the DEF storage tank and/or system with the aim of altering the composition of the material in the tank in directed manner.

BRIEF DESCRIPTION OF THE FIGURES

FIG. 1 Schematic diagram of a representative SCR exhaust treatment system for a diesel engine.

DESCRIPTION

For the purposes of promoting an understanding of the principles of the novel technology, reference will now be made to the preferred embodiments thereof, and specific language will be used to describe the same. It will nevertheless be understood that no limitation of the scope of the novel technology is thereby intended, such alterations, modifications, and further applications of the principles of the novel technology being contemplated as would normally occur to one skilled in the art to which the novel technology relates are within the scope of this disclosure and what it claims.

Unless implicitly intended or explicitly stated otherwise, the term, 'about' as used herein refers to a range of values including plus or minus 10 percent of the stated value, for example, about 1.0 encompasses the range of values 0.9 to 1.1.

Most industrialized nations set limits on the levels of $NO_x$ that can be released into the atmosphere by diesel engines. In the United States, the Environmental Protection Agency (EPA) is the agency of the federal government responsible for regulating diesel engine exhaust emissions. The EPA has proffered new regulations governing the levels of $NO_x$ that can be legally discharged into the atmosphere by diesel engines powering off-road equipment. These new regulations are referred to as, 'Final Tier 4'. The EPA's Final Tier 4 standards require that diesel engines which are operated off-road limit their $NO_x$ emissions to no more than 0.4 g/kW-h.

Currently available technology used to reduce the amount of $NO_x$ emission emitted from diesel exhaust fumes includes Selective Catalytic Reduction (SCR). This technology is widely used to reduce $NO_x$ emissions from heavy duty diesel engines and takes advantage of the high temperatures found in diesel exhaust fumes. Typical chemical reactions catalyzed by SCR catalysts are the reduction of $NO_x$ such as $NO_2$ or NO to $N_2$ and $H_2O$. In SCR based exhaust treatment systems, the oxidized forms of Nitrogen are reacted with compounds such as ammonia ($NH_3$). Some of the reactions that occur on the surface of the SCR catalyst include the following:

$$4NH_3 + 4NO + O_2 \rightarrow 4N_2 + 6H_2O \quad \text{Equation 1;}$$

$$2NH_3 + NO + NO_2 \rightarrow 2N_2 + 3H_2O \quad \text{Equation 2;}$$

$$8NH_3 + 6NO_2 \rightarrow 7N_2 + 12H_2O \quad \text{Equation 3.}$$

A typical SCR catalyst comprises a large surface area and includes an inert heat substrate that is coated with at least one stable catalytic material. Substrates used in such catalysts include ceramic materials; typical catalytic materials include metals and/or metal oxides such as copper, iron, vanadium, and the like. The particular combination of catalytic surface material and substrate for use in a particular application depends in part on a number of factors such as the composition fuel being combusted including, for example the amount of sulphur in the fuel, the temperature of the exhaust gases, the levels of $NO_x$ reduction desired, the reductant being used, the levels and types of other compounds present in the exhaust fumes and the like.

Anhydrous ammonia exists predominately as a gas under ambient conditions while aqueous ammonia is formed by contacting ammonia with water. Anhydrous ammonia is difficult to handle and dangerous if not properly contained. Ammonia carrier such as urea is safer and easier to handle, store and transport than anhydrous ammonia. Urea plus water exists in liquid form at standard temperature and pressure. DEF is an especially useful reductant for use in mobile applications since it is easier to handle, store and transport than anhydrous ammonia and it usually has a higher ratio of nitrogen to volume than does the typical aqueous ammonia formulation. Accordingly, DEF is a commonly used reductant in SCR diesel exhaust treatment systems used in mobile applications such as heavy trucks and off-road construction and agricultural equipment.

In a typical SCR based exhaust treatment system, an SCR catalyst is positioned in the exhaust stream of a diesel engine. The catalyst is positioned such that the temperature of the exhaust fumes contacting the surface of the catalyst is high enough to sustain the reaction of the $NO_x$ in the exhaust fumes with the reductant but not so high that the heat produced by the engine and the chemical reactions that take place in the exhaust stream damages the catalyst.

Referring now to FIG. 1, a schematic diagram of a typical heavy duty diesel exhaust treatment system (2). An SCR catalyst (4) is positioned within an exhaust pipe (6). The exhaust pipe has two ends. One end (8) is connected to a source of $NO_x$ (10) and the other end (12) is vented to the atmosphere (14). A typical system may also include an option additional pair of catalysts, (16) and (18), these are positioned before (16) and after (18) the SCR catalyst (4). The oxidation catalysts catalyse the oxidation of various compounds in the exhaust stream including organic molecules and un-reacted ammonia.

Because the SCR system requires a reductant such as ammonia or urea, the SCR system includes a system for storing, and delivering the reductant to the catalyst. Still referring to FIG. 1. Reductant storage vessel (20) is connected to a first delivery tube (22). First delivery tube 1 has two ends the first end the inlet (24) of tube (22) is connected to storage vessel (20) while the second end the outlet (26) of tube (22) is connected to a reductant delivery valve (28) that regulates the flow of the reductant from tube (22) to a second delivery tube (30). Tube 30 also has two ends the first end inlet (32) is connected to the outlet of valve (28) while the second end outlet (34) of second delivery tube (32) is connected to the exhaust pipe (6). The outlet (34) of second delivery tube (30) is connected to exhaust pipe (6) such that the reductant in second delivery tube (30) is delivered onto or near the surface of SCR catalyst (4) by outlet (34).

In some embodiments, the SCR system (2) may include a device (36) for maintaining the temperature of the reductant in storage vessel (20). In some configurations, the first reductant delivery tube (22), the reductant delivery value (28) and/or the second reductant delivery tube (30) may also be equipped with a device (40) to help regulate the temperature of the reductant in the system. In some embodiments of the invention, the device for regulating the temperature of the reductant (40) may be selected from the group consisting of: insulation, a heating coil or sock; and/or a cooling or warming jacket or some combination thereof.

In some embodiments, the system (2) may further include an optional mixing device (42) supplied to either periodically or continuously agitate the contents of reductant storage vessel (20). Vessel (20) may also be equipped with a temperature sensor (44) to measure the temperature of the contents of vessel (20). Vessel (20) may also be equipped with a probe (46) for measuring the nitrogen content of the material stored in vessel (20). In some embodiments, the system may be supplied with a controller (42) which may include inputs from sensors connected to the exhaust and/or SCR systems. The controller may also be equipped with a Central Processing Unit or dedicated logic circuits that regulate the dispersion of reductant to the system as necessary to maintain the release of $NO_x$ within acceptable limits. The controller may also be used to monitor the temperature or the reductant delivery system and perhaps to control portions of the system dedicated to maintain the reductant within an acceptable temperature range. In some embodiments, the same controller is used to regulate the rate and/or frequency of the agitator associated with reductant storage tank one. In some embodiments, the controller may be used to monitor the level of reductant and/or the composition of the reductant in reductant storage vessel (20).

Sensors that can be used to monitor the level of compounds that include ammonia and urea in DEF formulation include, but are not limited, to those disclosed in U.S. Pat. No. 7,722,813 issued on May 25, 2010 which is incorporated herein by reference in its entirety. Brief, some of these sensors operate by measuring the ability of a formulation of DEF to transfer heat and correlating this property with the concentration of say urea in the system. In some versions the sensor in the form of a probe is inserted into the DEF formulation. In some embodiments the system includes a circuit used to supply a current applied to a heating element positioned in a portion of the probe that is submerged in the DEF in order to produce heat and a temperature sensing device that is also submerged in the DEF. The amount of current that must be applied to the heating element in order to produce a discernable effect on the temperature sensor is influenced by the composition of the liquid surrounding the probe tip. The relationship between the levels of current that must be applied to affect a temperature change measured at the probe's temperature sensor can be determined as a function of say urea content in the DEF. Once the relationship between current and urea content is known for a given probe and a formulation with certain components the relationship can then be used to infer the level of urea in a sample of DEF by measuring the amount of current required to effect a change in temperature. Any method that can be used to determine or least estimate the composition of DEF in a storage tank or anywhere in a SCR system can be used to practice the invention.

Standard DEF exhibits a freezing point of −11C. DEF formulation according to the instant invention, which includes ammonium carbamate an anti-freezing agent, added to an aqueous urea solution, may reduce the freezing point of the DEF to −34C. In addition, some formulations of this mixture exhibit an ammonia content of 0.262 kg/kg, which is 30% higher than standard DEF (0.184 kg/kg). Several other mixtures of ammonium carbamate and urea have been prepared and characterized (see Table 1). For example, an aqueous solution containing 28.6 wt % of urea and 4.5 wt % of ammonium carbamate provides a freezing point of −13° C., as well as an ammonia content similar to that of standard DEF.

TABLE 1

Ammonia content calculation on Ammonium Carbamate.

| Freezing point (° C.) | water (wt %) | urea (wt %) | Amm. Carbamate (wt %) | $NH_3$ content (molar mass, g) Urea | $NH_3$ content (molar mass, g) Amm. Carbamate | Total $NH_3$ content (g) | Total $NH_3$ content (kg/kg) |
|---|---|---|---|---|---|---|---|
| −13.02 | 66.8 | 28.6 | 4.5 | 16.21 | 1.96 | 18.17 | 0.182 |
| −15.55 | 62.9 | 27 | 10.1 | 15.30 | 4.40 | 19.70 | 0.197 |
| −18.82 | 59.5 | 25.5 | 15 | 14.45 | 6.54 | 20.99 | 0.210 |
| −22.75 | 56 | 24 | 20 | 13.60 | 8.72 | 22.32 | 0.223 |
| −25 | 52.4 | 22.4 | 25.2 | 12.69 | 10.98 | 23.68 | 0.237 |
| −30.92 | 49 | 21 | 29.9 | 11.90 | 13.03 | 24.93 | 0.249 |
| −34 | 45.5 | 19.5 | 34.9 | 11.05 | 15.21 | 26.26 | 0.263 |

Referring now to Table 2.

TABLE 2

For reference: Ammonia content for Denoxium 20 and DEF solution

| Solution type | Mixture of | wt % in aqueous solution | $NH_3$ content (kg/kg) |
|---|---|---|---|
| Denoxium 20 | Ammonium formate | 18.9 | 5.1 |
|  | urea | 23.6 | 13.37 |
| DEF | by itself | 32.5 | 0.184 |

One concern when using these mixtures is the thermal stability of ammonium carbamate in an aqueous solution. When mixed with water and exposed to ambient temperature, ammonium carbamate will decompose to ammonia and carbon dioxide. Thus, the ammonia content of a given mixture of DEF has the potential to change over time. The loss of ammonium carbamate can cause a rise in the mixture's freezing point and it may also affect the efficiency of SCR system. One way of addressing this concern is to formulate a mixture that has more ammonia than is optimal and to rely on the heat induced degradation of ammonium carbamate to adjust the range of components to exist in a range that exhibits desired characteristics. Any deliberate change in the composition of the mixture would have to be balanced against an elevated freezing point, expense of ammonium carbamate due to the thermal effect noted above.

Still another method that can be used to at least partially overcome the heat driven change in the inventive compositions is to create formulations of DEF that can be used to replace standard DEF only during cold weather operation. Presumably, the latter would occur to a lesser extent due to the fact that the winter formula would be used only during those months when the ambient temperature was low. This formulation would have the same ammonia content as standard DEF. Using this approach involves weighing the benefit of the much lower freezing point of the winter formulation against the potential loss of ammonia content due to thermal decomposition and may be problematic in applications that routinely involve short time frame shifts from cold to warm conditions as are common in applications such as long-haul trucking.

Still another method that can be used to ensure that the composition of the reductant in the SCR exhaust treatment system is sufficient to advantageously support the reduction of $NO_x$ in the treated exhaust is to measure the composition of the reductant in the system and to adjust the formulation accordingly. This method may include the use of pre-packaged quantities of powdered ammonium carbamate which can be added as need to the reductant formulation as necessary to maintain the freezing point and reductant content of the formulation within acceptable operating parameters. In some embodiments, the SCR system includes an apparatus to measure the amount of reductant in the system and if necessary to determine the freezing point of the formulation. DEF sensors can be used to make the requisite determination of content and freezing point depression.

A DEF formulation with high nitrogen content and low freezing point is very useful especially in cold climates. The proper formulation may obviate or at least reduce the need for heated storage tanks at outlets, such as truck stops, filing stations, parts supply houses and the like that that provide DEF to end uses such as the operators of heavy-duty diesel trucks, off-road diesel powered machinery. These types of formulations are also useful in the field where DEF associated with a mobile diesel engine such as that of heavy-duty trucks may readily and even routinely move regions of moderate or even high temperatures to areas with low temperatures.

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A formulation for reducing oxides of nitrogen in diesel engine exhaust, including a liquid solution comprising:
    between about 15.0 wt. % to about 40.0 wt. % urea;
    between about 4.5 wt. % to about 40.0 wt. % ammonium carbamate; and
    between about 40.0 wt. % to about 81.0 wt. % water, wherein said formulation is suitable for the Selective Catalytic Reduction of $NO_x$ in diesel exhaust gases.

2. The formulation according to claim 1, comprising
    between about 15.0 wt. % to about 40.0 wt. % urea;
    between about 15.0 wt. % to about 40.0 wt. % ammonium carbamate; and
    between about 40.0 wt. % to about 60.0 wt. % water, wherein said formulation is suitable for the Selective Catalytic Reduction of $NO_x$ in diesel exhaust gases.

3. The formulation according to claim 1, comprising
    between about 19.0 wt. % to about 35.0 wt. % urea;
    between about 15.0 wt. % to about 40.0 wt. % ammonium carbamate; and between about 40.0 wt. % to about 60.0 wt. % water.

4. A formulation according to claim 1, comprising:
    between about 19.0 wt. % to about 30.0 wt. % urea;
    between about 15.0 wt. % to about 40.0 wt. % ammonium carbamate; and
    between about 40.0 wt. % to about 60.0 wt. % water.

5. The formulation according to claim 1, wherein said formulation comprises:
    between about 19.0 wt. % to about 25.0 wt. % urea;
    between about 20.0 wt. % to about 35.0 wt. % ammonium carbamate; and
    between about 45.0 wt. % to about wt. 55.0% water.

6. The formulation according to claim 1, wherein said formulation comprises:
    between about 19.0 wt. % to about 22.0 wt. % urea;
    between about 30.0 wt. % to about 35.0 wt. % ammonium carbamate; and
    between about 45.0 wt. % to about 50.0 wt. % water.

7. A method for reducing an oxide of nitrogen in diesel exhaust, comprising the steps of:
    providing a formulation, wherein the formulation includes a liquid solution comprising:
        between about 15.0 wt. % to about 40.0 wt. % urea;
        between about 4.5 wt. % to about 40.0 wt. % ammonium carbamate; and
        between about 40.0 wt. % to about 81.0 wt. % water, wherein said formulation is suitable for use in the Selective Catalytic Reduction of $NO_x$ in diesel engine exhaust gases.

8. The method according to claim 7, further including the steps of:
    supplying a Selective Catalytic Reduction catalyst that catalyses the combination of ammonia and $NO_x$ to form $N_2$; and
    contacting at least a portion of said formulation with the catalyst.

9. The method according to claim 7, wherein said formulation, comprises:
    between about 15.0 wt. % to about 40.0 wt. % urea;
    between about 15.0 wt. % to about 40.0 wt. % ammonium carbamate; and
    between about 40.0 wt. % to about 60.0 wt. % water, wherein said formulation is suitable for the Selective Catalytic Reduction of $NO_x$ in diesel exhaust gases.

10. The method according to claim 7, wherein said formulation, comprises:
    between about 19.0 wt. % to about 35.0 wt. % urea;
    between about 15.0 wt. % to about 40.0 wt. % ammonium carbamate; and between about 40.0 wt. % to about 60.0 wt. % water.

11. The method according to claim 7, wherein said formulation, comprises:
    between about 19.0 wt. % to about 25.0 wt. % urea;
    between about 20.0 wt. % to about 35.0 wt. % ammonium carbamate; and
    between about 45.0 wt. % to about wt. 55.0% water.

12. The method according to claim 7, wherein said formulation, comprises:
    between about 19.0 wt. % to about 22.0 wt. % urea;
    between about 30.0 wt. % to about 35.0 wt. % ammonium carbamate; and
    between about 45.0 wt. % to about 50.0 wt. % water.

13. The method according to claim 7, further including the step of:
    determining the composition of said formulation.

14. The method according to claim 13, wherein the determining step includes measuring the amount of urea in said formulation.

15. The method according to claim 14, wherein the determining step includes using a sensor and wherein the sensor is in contact with said formulation.

16. The method according to claim 7, further including the step of:

adjusting the composition of said formulation by the addition of at least one chemical to said formulation, wherein the at least one chemical is selected from the group consisting of: urea, ammonium carbamate and water.

17. A system for reducing the level of NOx released into the atmosphere by the combustion of diesel fuel; comprising a formulation, wherein said formulation includes a liquid solution comprising:

between about 15.0 wt. % to about 40.0 wt. % urea;

between about 4.5 wt. % to about 40.0 wt.% ammonium carbamate; and between about 40.0 wt. % to about 81.0 wt. % water; wherein said formulation is suitable for the Selective Catalytic Reduction of $NO_x$ in diesel exhaust gases; and a reservoir for holding said formulation.

18. The system according to claim 17, further including a Selective Catalytic Reduction catalyst, wherein the catalyst catalyzes the reaction of ammonia and $NO_x$ to $N_2$.

19. The system according to claim 17, wherein the formulation, comprises:

between about 15.0 wt. % to about 40.0 wt. % urea;

between about 15.0 wt. % to about 40.0 wt. % ammonium carbamate; and between about 40.0 wt. % to about 60.0 wt. % water.

20. The system according to claim 17, wherein said formulation comprises:

between about 19.0 wt. % to about 35.0 wt. % urea;

between about 20.0 wt. % to about 35.0 wt. % ammonium carbamate; and between about 45.0 wt. % to about wt. 55.0% water.

21. The system according to claim 17, wherein said formulation comprises:

between about 19.0 wt. % to about 22.0 wt. % urea;

between about 30.0 wt. % to about 35.0 wt. % ammonium carbamate; and between about 45.0 wt. % to about 50.0 wt. % water.

22. The system according to claim 17, further including:

a device for measuring the composition of said formulation.

23. The system according to claim 17, where the system further includes a reservoir of ammonium carbamate to add to said formulation.

* * * * *